United States Patent [19]

Paradine et al.

[11] 4,159,517

[45] Jun. 26, 1979

[54] JOURNAL BACK-UP STORAGE CONTROL FOR A DATA PROCESSING SYSTEM

[75] Inventors: Christopher Paradine, Chandler's Ford; Geoffrey W. Robinson, West Wellow, both of England

[73] Assignee: International Business Machines Corporation, Armonk, N.Y.

[21] Appl. No.: 792,282

[22] Filed: Apr. 29, 1977

[30] Foreign Application Priority Data

Jul. 7, 1976 [GB] United Kingdom ............... 28257/76

[51] Int. Cl.² ...................... G06F 13/00; G06F 15/00
[52] U.S. Cl. .................................................. 364/200
[58] Field of Search ... 364/900 MS File, 200 MS File; 235/92 CC, 92 TF, 92 T

[56] References Cited

U.S. PATENT DOCUMENTS

| | | | |
|---|---|---|---|
| 3,302,185 | 1/1967 | Cox, Jr. et al. ....................... | 364/200 |
| 3,648,247 | 3/1972 | Guzak, Jr. ............................ | 364/200 |
| 3,665,416 | 5/1972 | Hikosaka ............................. | 364/200 |
| 3,771,137 | 11/1973 | Barner et al. ....................... | 364/200 |
| 3,772,657 | 11/1973 | Marsalka et al. .................... | 364/200 |
| 3,909,526 | 9/1975 | Fretwell et al. .................... | 178/66 R |
| 3,925,762 | 12/1975 | Heitlinger et al. .................. | 340/150 |

*Primary Examiner*—Gareth D. Shaw
*Assistant Examiner*—Michael C. Sachs
*Attorney, Agent, or Firm*—Bernard M. Goldman

[57] ABSTRACT

A data processing system is disclosed which includes a control system with a buffer store connected to a central processing unit to receive data items before they are transferred to a secondary journal store. A monitoring system keeps a check on the rate at which data items are placed in the buffer store by setting a sample value, which is a count of the accumulated size of items in the buffer store, and a sample time which is a period, such as one second, considered a reasonable waiting time for a transaction, either of which when reached can cause the contents of the buffer to be transferred to the secondary journal store. If the sample time is reached before the sample value, then the value is increased.

3 Claims, 3 Drawing Figures

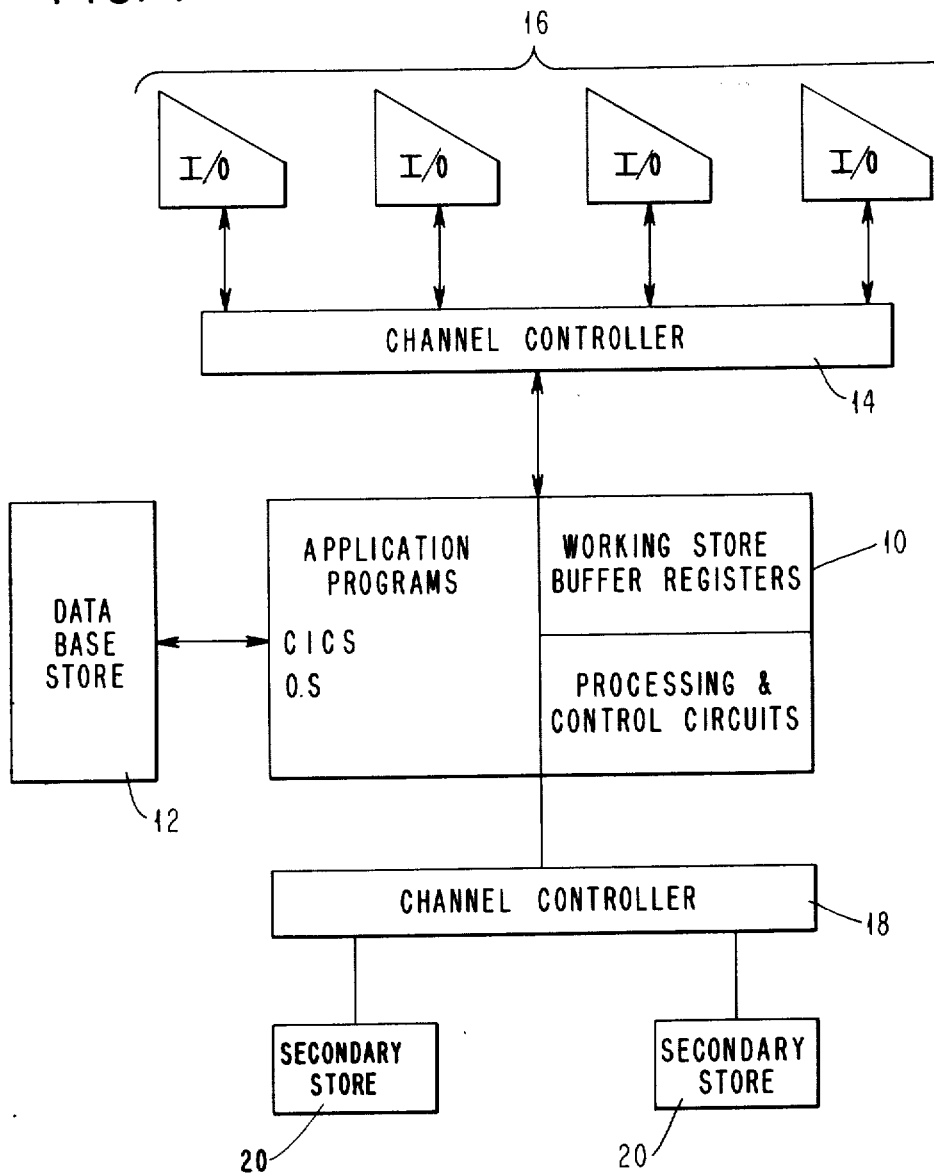

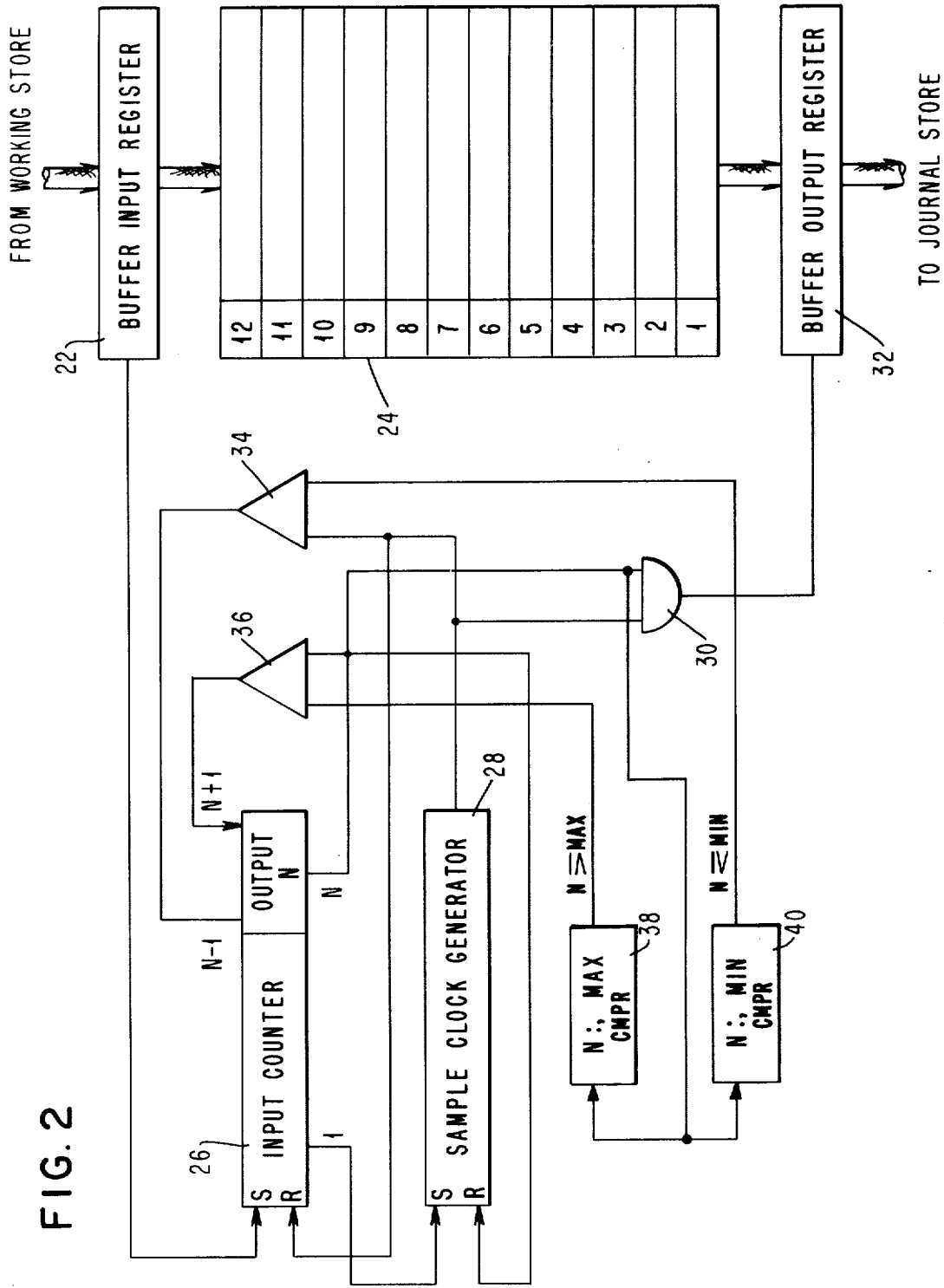

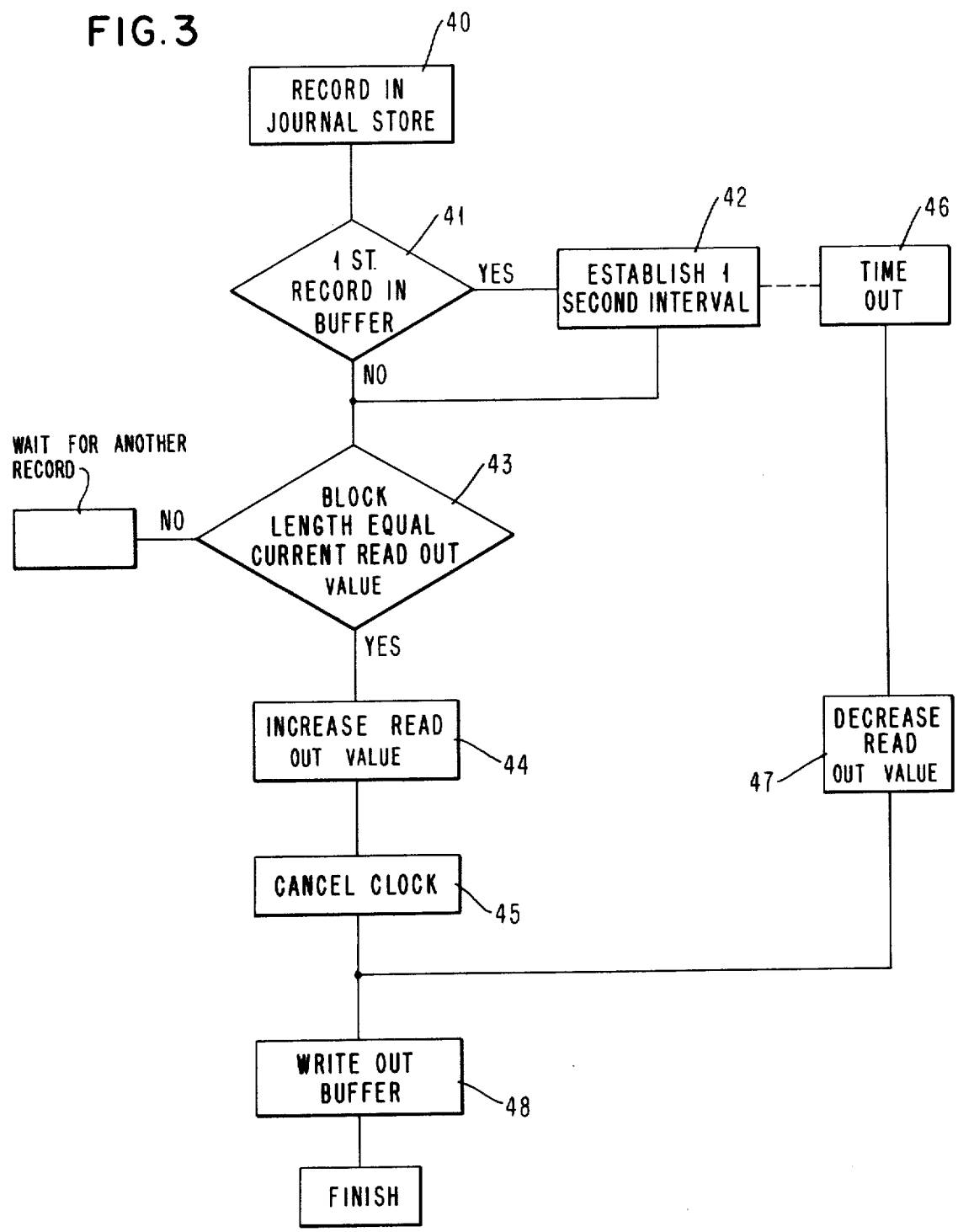

JOURNAL BACK-UP STORAGE CONTROL FOR A DATA PROCESSING SYSTEM

This invention relates to data processing systems and particularly but not necessarily exclusively to such systems known as multi-processing systems in which a plurality of tasks or transactions can take place concurrently using data stored in a common data base or store.

In such data processing systems where tasks or transactions are constantly having access to, and updating files of information, or a data base, it is useful to have a recovery procedure so that if the system fails for one reason or another then any data item, upon which work is currently being done, can be restored to its original value without being irretrievably lost. This is equally true for messages. A recovery procedure is needed to enable the system to recreate messages that are lost, either during input or output.

A technique that can be used is to maintain a log or journal of all the data items used in their uncorrupted or pre-use state on a secondary journal store. Examples of prior art techniques are described in UK Pat. Nos. 1,168,414 and 1,163,859 both assigned to International Business Machines Corporation. The main concern is to hold in some non-volatile store a copy of any data item, that is exposed during a task until the task is completed, error checks have shown that there are no errors and the data item returned to non-volatile storage. If a data item is constantly being changed or used in tasks, it will appear in the journal store once for every use. Then if there is a system failure with data items in the course of being used, it is possible to scan the journal store and to restore any item to the value it had before the failure occurred. These techniques are referred to as journalling and recovery.

The use of journalling brings an extra overhead of cost and extra machine time to a data processing system and there is a conflict between the desire not to keep a task or transaction waiting too long before the data item it needs is safely written into a journal store and the need to contain the number of write operations within reasonable bounds.

One solution of the conflict is to employ a buffer store in the main data processing machine for storing the requested data items and only writing them into the journal store when a predetermined block size has been reached. A rigid system such as this can result, when the transaction rate is low, in some transactions or tasks having to wait an unreasonable time before they can be allowed to proceed and use a data item, as this can only be allowed when the journallized copy of the data item is safely written into the non-volatile journal store.

An object of the present invention is to provide a more flexible journalling system.

According to the invention, there is provided a data processing system comprising a central processing unit, a main store, a secondary non-volatile store and a plurality of input-output terminals connected to the central processing unit in which a plurality of transactions may take place concurrently and any data item which will be changed by a transaction is recorded on the secondary non-volatile store before the change is committed. The system also includes a buffer store connected to the central processing unit and is arranged to receive data items from the main store when a transaction is about to change the item, control means to set a read-out limit for the number of items in the buffer store and a time interval means to initiate a transfer of items held in the buffer store to said secondary store whenever the read-out limit is reached or the time interval expires, and means to alter either the read-out limit or the time interval so that when the rate of data items received by the buffer store decreases the read-out limit or the time interval decreases and when the rate increases the read-out limit or the time interval increases.

In the description and claims, reference is made to data items. By this, it is meant any record which may be a fixed or variable number of bytes in length, and which is normally stored in the main store or data base of the data processing system. The data item may be used by a task or transaction to provide input data for that task to perform its function or the data item itself may be changed as a result of the function.

In a preferred embodiment of a data processing system, which includes a control system such as the IBM Customer Information Control System/Virtual Storage (CICS/VS) (IBM is a Registered Trademark of International Business Machines Corporation), there is a buffer store connected in its main central processing unit which receives data items before they are transferred to a secondary journal store. A monitoring system keeps a check on the rate at which data items are placed in the buffer store by setting a sample value, which is a count of the accumulated size of items in the buffer store, and a sample time which is a period such as one second considered a reasonable waiting time for a transaction, either of which when reached can cause the contents of the buffer to be transferred to a secondary journal store. If the sample time is reached before the sample value, then the value is decreased and if vice versa, then the value is increased. The system can be implemented either in hardware with logic block controls, using a microcode program which performs the functions of the hardware logic or using a higher level language which implements the logic through the operating system of the data processing system.

In order that the invention may be fully understood the preferred embodiments thereof will now be described with reference to the accompanying drawings.

FIG. 1 is a schematic diagram of the data processing system incorporating the invention.

FIG. 2 is a schematic diagram of a hardware embodiment of the invention.

FIG. 3 is a flow chart showing the operation of the embodiment in FIG. 2, the logic of a software embodiment of the invention.

Data processing systems have many varied applications and many systems are capable of processing many varied applications simultaneously in what is known as a real-time mode of operation. That is, to each separate user the system looks as if it is dedicated to answering his query at the time he puts it. In order to operate in such a mode, it is desirable for the data processing system to have not only its normal operating system, but a control system that manages data centrally in a data base for all the application programs. Such a system is the IBM Customer Information Control System described in Customer Information Control System-General Information Manual (GH20-1028-4) published by International Business Machines Corporation.

Referring now to FIG. 1, a block schematic of a data processing system capable of operating in a real-time mode is shown. A central processing unit, CPU 10, which may be an IBM System 370/158 contains the usual processing and control circuits, a working store with buffer registers and a storage area into which are loaded the operating system, the control system (CICS) and the application programs currently being used by the users of the IBM CICS system.

A data base store 12 which communicates directly with the CPU may comprise several stacks of disk files or some other fast random access devices. The data base store contains the files of data records or items which are available to the users of the system. As any one system can be used simultaneously for such diverse applications as stock control, customer invoicing and employee payroll, the data base will reflect a valuable asset and its integrity should always be assured.

Communicating with the central processing unit 10 through a channel controller 14 is a plurality of input output devices or terminals 16. An I/O terminal may have one of several different forms, but basically it will have a means such as a keyboard for entering a message to be sent to the CPU and a means such as a printer or a cathode ray tube display device for exhibiting messages returned by the CPU.

A second channel controller 18 connects the CPU 10 with a plurality of secondary stores 20 which may be tape drive units or further disk storage devices.

A point to remember is that the data base storage devices 12 and the secondary storage devices 20 are non-volatile stores, that is their ability to retain data records or items is not dependent upon the maintenance of an electrical supply, whereas the storage devices in the CPU 10 are often volatile and data stored in them can be lost if there is a failure of the electrical supply or if for some other reasons the system fails to operate correctly, of if the system is turned off for any reason.

The drawing of FIG. 1 is very schematic and shows in very simple terms the connections between the units making up the data processing system, as anyone skilled in the art will know the actual connections are more complex and can be almost infinitely variable. However, FIG. 1 does illustrate a generalized environment for an embodiment of the present invention.

When the system is in operation, several of the terminals 16 may be using the same application program in, for example, stock control or invoicing operations and consequently many transactions involving the same file or data and the same data items may be occurring concurrently. The control system ensures that no two transactions are changing the same data item simultaneously, which can be the cause of a first delay in completing a transaction, the control system also ensures that any data item before it is changed by a transaction is stored in its unchanged form on a secondary store 20 known as the journal store. A characteristic of the journal store is that items journalled will remain unaltered for days, weeks or even months, so that human or system errors involving the main store can be recovered from inspection of the journal.

The act of storing data items or records on a secondary store takes up CPU and I/O time and is obviously an overhead on the system in that while the system is controlling that operation, it is not processing some transaction. A first step to reducing the overhead is to employ a buffer store in the CPU and store data items as they are required by transactions until a block of a predetermined number of records is formed and then transferring the block to the journal store, block transfer being much more efficient in CPU and I/O utilization than single record transfer.

This solution necessarily means that a transaction that has called the first data item from the data base to be stored at the beginning of a block cannot proceed and change the item until the block is complete and transferred to the journal store. If the transaction rate is low, this wait can be a considerable time which will cause frustration to the user who initiated the transaction. On the other hand, if the transaction rate is high or the block size is low, the CPU may be spending excessive time transferring data items to the journal store and a queue for processing will build up causing further delay.

FIG. 2 illustrates the control of a buffer store for varying the block size for transferring data items to the journal store depending upon the rate of transactions and thus optimizing the wait time of transactions and the transfer overhead.

When a transaction requires to update or modify data stored in the data base, the control system of the data processing system organizes the transfer of data from the data base store to the CPU working store. The data records may be of a fixed or variable number of bytes, and in most general systems, will be of varying size. However, for ease of understanding the invention, in this example, it will be assumed that data items are of fixed length. Of course, one record could be made up of several data items. When a data item is transferred to the working store, if the transaction indicates that it will change the item, it is also sent to the buffer input register 22 of a journal buffer 24. Again for ease of understanding, the buffer is shown with only twelve positions, in a real system there would be at least 100 times this number.

The buffer input register 22 has a connection to an input counter 26 which counts by one for each data item received by the input register. The input counter 26 is arranged to provide an output signal on its first count position and also to give an output at an $n^{th}$ count position with n being a variable number. The output from the first count position starts a sample clock generator 28 which produces an output after a predetermined period, in this example one second.

Both the $n^{th}$ output of the counter 26 and the 1 second output from the sample clock generator 28 are fed to an OR circuit 30 and from that initiates a read out of m positions, where m is the number of positions in journal buffer 24 that have been filled in journal buffer 24 by the n records. From the buffer output register 32, the data items are transferred through channel controller 18 (FIG. 1) to the secondary journal store.

As well as initiating readout, the outputs of the counter 26 and clock generator 28 control the resetting of each other. The $n^{th}$ output of counter 26 is connected directly to the reset connection of sample clock generator 28 and the output of the clock generator is connected to the reset connection of counter 26.

Thus, if when a series of data items are read into the buffer store and the count n is reached before 1 second has elapsed, then the counter output initiates readout of the journal buffer. While if the time of 1 second passes before n have been received, then the clock pulse initiates readout. In no case will a transaction have to wait for more than one second.

As stated above, the count n is variable and the variation is made by having the counter output increase the size of n through AND circuit 34 and by having the clock generator output decrease the size of n through AND circuit 36.

An additional feature is to control the maximum and minimum sizes of $n^{th}$ block transfer size—through comparator circuits 38 and 40. These circuits compare the size of n to predetermined maximum (MAX) and minimum (MIN) values preset within these circuits. When n is equal to or greater than the predetermined maximum number then the output of circuit 38 inhibits AND gate 34 to prevent increasing n in counter 26. Similarly, when n is equal to or less than the predetermined minimum number, then the output of circuit 40 inhibits AND gate 36 to prevent an increase in the read out value n in counter 26.

The maximum size of n is set so that while a read out operation from journal buffer 24 is taking place, there is room left for continuing input from input register 22. In the example of FIG. 2, maximum n would be set at 8. The minimum may be set at 2 as this may be considered the least number for which it is worth performing a specific readout operation.

In operation, if for example, n is set at 5, then after a readout of the journal buffer when a transaction (A) initiated at a terminal 16 (FIG. 1) subsequently requests two data items to be changed, then the control system (CICS) will obtain the two items (a, b) from the data base store 12, place them in the working store 10, and direct them to the buffer input register 22. The control system will then hold the transaction in a wait state until the data items (a, b) are placed in the journal store. The entry of data item a in the buffer input registers 22 causes the input counter 26 to count one and this count starts the sample clock generator running. The entry of further data items then causes the counter to count by one for each.

A second transaction (B) initiated at a second terminal may require a further two data items (c, d) and these are also directed to the buffer input register.

If when items a, b, c and d are placed in the buffer and before any further transactions are initiated, the sample clock generator generates a 1 second output pulse, then a read out operation of the journal buffer 24 is started through buffer output register 32, input counter 26 is reset and n is decreased by 1 to become 4.

Similarly, if before the clock generator generates the 1 second output pulse, a third transaction (C) requires two further data items (e, f) then the item e will cause the input counter to reach 5 which equals n and will then generate an n output pulse which causes a read out of journal buffer 24, resets the sample clock generator 28 and adds one to the value of n making it 6. The data item f will restart the count in the input counter and consequently the sample clock generator.

Because the third transaction (C) requires the data item f, it will have to wait before proceeding until the next read out of the journal buffer. However, the control system now proceeds with transactions A and B, which at the most will have had to wait one second which is considered an acceptable time.

The operation of the embodiment in FIG. 2 is represented by the flow diagram in FIG. 3.

The above explanation has been much simplified, of course, and obvious housekeeping is associated with a transaction using an application program stored in the CPU, and various tasks associated with the transaction can be taking place in the conventional manner presently done in, for example, the commercially available IBM CICS program referenced above while the transaction waits to process a data item. If data records are of a length of several hundred bytes, then the control system must insure that the read out from the journal buffer does not truncate a record, as its identifying features may then be lost.

The hardware embodiment of the invention illustrated above can be implemented in software using the logic circuits of a general purpose computer such as an IBM System 370/158 controlled by a computer program. A flow chart of such a program is also represented by FIG. 3 which is explained in more detail below.

Of course, before the program proper starts, the various initializations of buffer size, read out value, etc. have to be made. Block 40 indicates that a data record is to be placed in the journal buffer. Block 41 determines whether or not it is the first record. If yes, then the clock generator is started for a one second interval. If no, then block 43 examines the buffer to see if the records stored are equal to the current read out size. If no, then wait for another record. If the block 43 decision is yes, then the read out size is increased by block 44, and the clock is cancelled by block 45.

If the time interval has elapsed, as indicated in block 46, then the read out value is decreased by block 47 and block 48 causes a write out of the buffer. The following is a detailed schematic for a sample program for performing these operations.

On Arrival of New Record:
Do; If first record in block
Then start 1 second timer interval:
Add record length to current block length
If current block length > read out value
Then do; Write out buffer;
Reset current block length to zero;
Cancel timer interval;
Increment current read out value according to amount of overflow;
(The overflow is: current block length - current read out value);
END;
END;
On expiration of time interval;
Do; Write out buffer;
Reset current block length to zero;
Decrement current read out value according to amount of underflow; (The underflow is: current read out value-current block length);
END;

This increase and decrease of the read out value in a system need not just be a plus and minus change as shown in the embodiment of FIG. 2, but preferably is based upon a fraction of the difference between the current block length when read out buffer 24 occurs and the current read out value, plus some incremental or decremental factor.

There now follows two sample programs which are expansions of blocks 44 and 47 of FIG. 3.
INCREMENTING:
Current read out value=Current read out value+$\lambda 1$($\lambda 1$ is: Current block length−Current Read out value)+I, where $\lambda 1$ is typically 1/10 in which I is typically 2 bytes.
DECREMENTING:
Current read out value=current read out value−$\lambda 2$($\lambda 2$ is: Current read out value−current block length)−D, where $\lambda 2$ is typically 1/10 in which D is typically 6 bytes.

By having D greater than I, then at a very low journal load, (less than 1 record per sample interval) several records will be written out immediately before one record arrives which has to wait the whole sample interval. (For I=2 and D=6, this is 3 immediate to 1 delayed.)

An alternative to varying the read out value is to alter the sample period according to the journal load. This can be done by similar techniques to those described above for altering the read out value for example, by changing the count in the sample clock generator instead of the input counter.

What is claimed is:

1. In a data processing system involving information retrieved in a data base comprising a central processing unit, a main store, a secondary non-volatile store and a plurality of input/output terminals connected to the central processing unit, in which a plurality of transactions may take place concurrently and any data item which will be changed by a transaction is recorded on the secondary non-volatile store before the change is committed, the system also including a buffer store connected to the central processing unit and arranged to receive data items from the main store when a transaction is about to change an item, the improvement comprising control means to set a read out value for the number of items receivable by the buffer store to induce a read out and to provide a time interval, means to initiate a transfer data base changed data items hel in the buffer store in said secondary store whenever the read out value is reached or the time interval expires, means to increase the read out value when the number of data items readout of the buffer store exceeds the existing readout value, and means to decrease the readout value when the number of data items readout of the buffer store is less than the existing readout value.

2. In a data processing system as claimed in claim 1 in which said control means includes a counter for counting the number of data items received by said buffer store and a sample clock generator for generating a pulse at the expiration of the time interval and in which, after a read out of data items from the buffer store, the next data item received causes the counter to start counting and the clock generator to start timing.

3. A data processing system for a data base as defined in claim 1, including means to inhibit a change in the read out value when the value exceeds a first predetermined amount or falls below a second predetermined amount.

* * * * *